United States Patent
Feather, Jr. et al.

(10) Patent No.: US 6,823,401 B2
(45) Date of Patent: Nov. 23, 2004

(54) MONITOR FOR OBTAINING DEVICE STATE BY INTELLIGENT SAMPLING

(75) Inventors: Stanley Smith Feather, Jr., Longmont, CO (US); Jeffery Dicorpo, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1 day.

(21) Appl. No.: 10/346,158

(22) Filed: Jan. 15, 2003

(65) Prior Publication Data

US 2004/0139195 A1 Jul. 15, 2004

(51) Int. Cl.$^7$ .......................................... G06F 15/173
(52) U.S. Cl. .............................. 710/18; 710/15; 710/19
(58) Field of Search .................. 340/635; 710/15–19; 714/42, 44, 45, 47, 37, 769–771; 307/38, 39, 40; 709/224

(56) References Cited

U.S. PATENT DOCUMENTS

| | | | | |
|---|---|---|---|---|
| 5,566,351 A | * | 10/1996 | Crittenden et al. | 710/46 |
| 5,758,189 A | * | 5/1998 | Nakada et al. | 710/46 |
| 5,809,303 A | * | 9/1998 | Senator | 719/325 |
| 5,828,583 A | * | 10/1998 | Bush et al. | 702/185 |
| 5,966,510 A | * | 10/1999 | Carbonneau et al. | 714/44 |
| 5,991,829 A | * | 11/1999 | Giorgio et al. | 710/15 |
| 6,182,022 B1 | * | 1/2001 | Mayle et al. | 702/182 |
| 6,263,454 B1 | * | 7/2001 | Gold et al. | 714/25 |
| 6,314,476 B1 | * | 11/2001 | Ohara | 710/15 |
| 6,360,336 B1 | * | 3/2002 | Christensen et al. | 714/47 |
| 6,438,712 B1 | * | 8/2002 | Abi-Saleh | 714/38 |
| 6,446,160 B1 | * | 9/2002 | Le et al. | 711/112 |
| 6,615,161 B1 | * | 9/2003 | Carney et al. | 702/186 |
| 6,697,900 B1 | * | 2/2004 | Hadley | 710/109 |
| 2002/0140962 A1 | * | 10/2002 | Oka | 358/1.14 |
| 2003/0061546 A1 | * | 3/2003 | Collins et al. | 714/42 |

FOREIGN PATENT DOCUMENTS

EP          1 113 690 A2  *  7/2001  ............ H04Q/7/38

OTHER PUBLICATIONS

Tape Alert Specification v3 Hewlett–Packard Company, copyright 2001.*

* cited by examiner

Primary Examiner—Fritz M. Fleming (57) ABSTRACT

An apparatus capable of determining state of a device comprises a controller and a monitor executable on the controller. The monitor is capable of passively monitoring traffic between an initiator and the device, determining when the passively monitored traffic is insufficient for identifying state of the device, and actively issuing supplemental commands to the device to refresh device information when passively monitored traffic is insufficient. The monitor can also determine device state from the device information.

30 Claims, 9 Drawing Sheets

| Value | Acquisition Method | Note |
|---|---|---|
| INQUIRY data | INQUIRY command, EVPD bit set to 0 | Normal INQUIRY data |
| INQUIRY: supported vital product pages | INQUIRY page 0x00 | |
| INQUIRY: unit serial number | INQUIRY page 0x80 | |
| INQUIRY: device identification page | INQUIRY page 0x83 | |
| INQUIRY: drive component revision levels | INQUIRY page 0xc0 – 0xc5 | |
| LOG SENSE: supported pages | LOG SENSE page 0x00 | |
| LOG SENSE: write error counters | LOG SENSE page 0x02 | |
| LOG SENSE: read error counters | LOG SENSE page 0x03 | |
| LOG SENSE: sequential access device log | LOG SENSE page 0x0c | |
| LOG SENSE: tape alert log | LOG SENSE page 0x2e | |
| LOG SENSE: tape usage log | LOG SENSE page 0x30 | |
| LOG SENSE: tape capacity log | LOG SENSE page 0x31 | |
| LOG SENSE: data compression log | LOG SENSE page 0x32 | |
| LOG SENSE: performance data log | LOG SENSE page 0x34 | |
| MODE SENSE: Disconnect/reconnect page | MODE SENSE page 0x02 | Also requires storage of the 6 and 10 byte MODE PARAMETER HEADER and BLOCK DESCRIPTOR |
| MODE SENSE: control mode | MODE SENSE page 0x0a | Also requires storage of the 6 and 10 byte MODE PARAMETER HEADER and BLOCK DESCRIPTOR |
| MODE SENSE: data compression characteristics | MODE SENSE page 0x0f | Also requires storage of the 6 and 10 byte MODE PARAMETER HEADER and BLOCK DESCRIPTOR |
| MODE SENSE: device c configuration | MODE SENSE page 0x10 | Also requires storage of the 6 and 10 byte MODE PARAMETER HEADER and BLOCK DESCRIPTOR |
| MODE SENSE: fibre channel logical unit control | MODE SENSE page 0x18 | Also requires storage of the 6 and 10 byte MODE PARAMETER HEADER and BLOCK DESCRIPTOR |
| MODE SENSE: fibre channel control | MODE SENSE page 0x19 | Also requires storage of the 6 and 10 byte MODE PARAMETER HEADER and BLOCK DESCRIPTOR |
| MODE SENSE: information exceptions | MODE SENSE page 0x1c | Also requires storage of the 6 and 10 byte MODE PARAMETER HEADER and BLOCK DESCRIPTOR |

FIG. 5A

| Value | Acquisition Method | Note |
|---|---|---|
| MODE SENSE: cd-rom emulation mode | MODE SENSE page 0x3e | Also requires storage of the 6 and 10 byte MODE PARAMETER HEADER and BLOCK DESCRIPTOR |
| MODE SENSE: all pages | MODE SENSE page 0x3f | Also requires storage of the 6 and 10 byte MODE PARAMETER HEADER and BLOCK DESCRIPTOR |
| PREVENT/ALLOW state | Initial value is set to the drive's default state.<br><br>When PREVENT/ALLOW is sampled, the state is updated based on status of the operation | |
| RESERVE/RELEASE state | Initial value is set to the drive's default state.<br><br>When PERSISTENT RESERVE/PERSISTENT RELEASE or RESERVE/RELEASE is sampled, the state is updated based on status of the operation | |
| Sense data | Initial value is set to the drive's default initial state (UNIT ATTN). This is maintained for each initiator's first access during the session.<br><br>Command status from the last 2 commands is stored on a per-initiator basis.<br><br>Sense data is stored from every REQUEST SENSE command on a per-initiator basis. | |
| Block limits | READ BLOCK LIMITS | |
| Density | REPORT DENSITY | |

MONITOR FOR OBTAINING DEVICE STATE BY INTELLIGENT SAMPLING

RELATED APPLICATIONS

The disclosed system and operating method are related to subject matter disclosed in the following co-pending patent applications that are incorporated by reference herein in their entirety: (1) U.S. patent application Ser. No. 10/346,045 entitled "Storage System with LUN Virtualization", and (2) U.S. patent application Ser. No. 10/346,002, entitled "Dynamic Command Filter".

BACKGROUND OF THE INVENTION

Information handling systems include various devices and components that control data transfer applications. The data transfer applications frequently access and use information relating to the state of a physical device. Reliability and performance of the system depends on the accuracy of the state information. The physical devices may take numerous forms in various applications and system types. In a data storage system, physical devices typically include tape drives, disk drives, other types of storage drives, and combinational or hybrid-type devices.

In typical systems, the device state may frequently change. Because the state can generally be determined accurately by the relatively slow process of issuing a command sequence, many applications ascertain the state at one time and assume that any state changes are based on results of commands that are sent. The assumption is generally relatively safe in direct-connect models in which state changes are mostly based deterministically on the command stream and rarely changed by extraneous events.

Errors can occur, and the device state may change, due to events other than commands sent by an application. In one example, the device may fail. Although failure is a rare event, some advanced applications require operation to continue nonetheless. Accordingly, the assumptions of operation are not invariably correct and may lead to loss of reliability in the field.

Some systems support multiple hosts, servers, or other initiators so that device state may change because two initiators can simultaneously use or attempt to use the same device. In multiple-initiator configurations, more than one initiator can change state of a device, but each initiator assumes that the state changes based only on commands from that initiator. In many cases, the actual state of the device can be different from the assumptions of any initiator. In a storage area network (SAN) configuration, a device can commonly be shared by a dozen or more servers, increasing the possibility that state assumptions are inaccurate.

Some systems attempt to resolve device conflicts by polling the device at regular or irregular intervals. For example, using a Netbackup scan-host concept, a single server can issue a set of commands to determine a state of any device that is not in use. When another initiator or server running Netbackup seeks access to state information, the initiator or server contacts the scan-host database rather than issuing polling commands. The concept can only be successful when all possible contact to the device is through Netbackup with Netbackup properly configured, demands that result in poor scalability. Usage of Netbackup typically also requires an extra server or initiator to support scan-host functionality.

SUMMARY OF THE INVENTION

In accordance with some embodiments of the disclosed system, an apparatus capable of determining state of a device comprises a controller and a monitor executable on the controller. The monitor is capable of passively monitoring traffic between an initiator and the device, determining when the passively monitored traffic is insufficient for identifying state of the device, and actively issuing supplemental commands to the device to refresh device information when passively monitored traffic is insufficient. The monitor can also determine device state from the device information.

In accordance with other embodiments, a method of obtaining device state comprises passively monitoring traffic between an initiator and a physical device and determining when the passively monitored traffic is insufficient for identifying state of the physical device. The method further comprises actively issuing supplemental commands to the physical device to refresh physical device information when passively monitored traffic is insufficient and determining device state from the physical device information.

BRIEF DESCRIPTION OF THE DRAWINGS

Embodiments of the invention relating to both structure and method of operation, may best be understood by referring to the following description and accompanying drawings.

FIGS. 5A and 5B show an embodiment of a table of data in a template that corresponds to a high-availability device application.

DETAILED DESCRIPTION

A common problem in multiple-initiator systems is that state information available at the individual initiators can be inaccurate because changes can be made by commands from other initiators, device failure, or other extraneous occurrences. Another problem is that acquisition of accurate state information can be time consuming.

What is needed is a system that obtains device state information in a more robust manner.

An information handling system can improve accuracy and performance by passing all commands and/or other directives directed to a device through a monitor. The monitor samples all traffic to the device, regardless of origin. The monitor can also sample all output signals passed by the device.

In addition to sampling, the monitor can poll, independently generate commands to the device and access results of the commands, to maintain accuracy of state information. In some embodiments, operation can be intelligent so that polling is not used to duplicate information already present by sampling.

In some embodiments, monitoring operations can be performed in parallel to other system operations.

In some embodiments, the degree of monitoring can be reduced or managed according to requirements of particular applications to a level that minimally impacts performance while accurately assessing device state.

A system comprises a monitor that obtains state information relating to a device based on intelligent sampling techniques. Device state can be determined by polling, but polling may be inaccurate if the device is controlled by multiple initiators. The illustrative system can replace or supplement polling by intercepting incoming and/or outgoing traffic from the device and sampling the intercepted traffic to determine device state. The monitor typically polls the device for desired information when sampling does not supply the information within a suitable time to maintain integrity of a data structure containing the device's state.

In various embodiments, the illustrative storage system prevents availability errors by responding to management commands and task management operations such as target reset operations with a virtual response on behalf of the target drive within the timeout period. A virtual target device responds to commands by informing the router of target drive state with respect to the first initiator, intercepting commands from subsequently acting initiators, and responding to the subsequent initiators without queuing. The virtual target device responds to task management operations by emulating, also called spoofing, the target drive's state for initiators that issue task management operations.

In various embodiments, a storage system may perform one or more of several functions to improve availability, data integrity, and performance. The system protects the state of the drive when engaged in a data transfer or media movement commands with a primary initiator. The system avoids unnecessary error recovery and task management traffic, and maintains optimum performance, by supplying expected management data within expected timing specifications to secondary initiators. The storage system can prevent or reduce introduction of new problems for operating systems or backup applications by maintaining the drive's interface specification, and defining a new interface specification that future operating system versions and applications can be written to support.

In some configurations, a system includes a device monitor that actively monitors communications and/or activities of a device, and maintains current state information about the device based on the monitored information. Other components and devices in the system can avoid the overhead of issuing commands and parsing results by using stored state information accumulated from prior operations.

Figure 1:
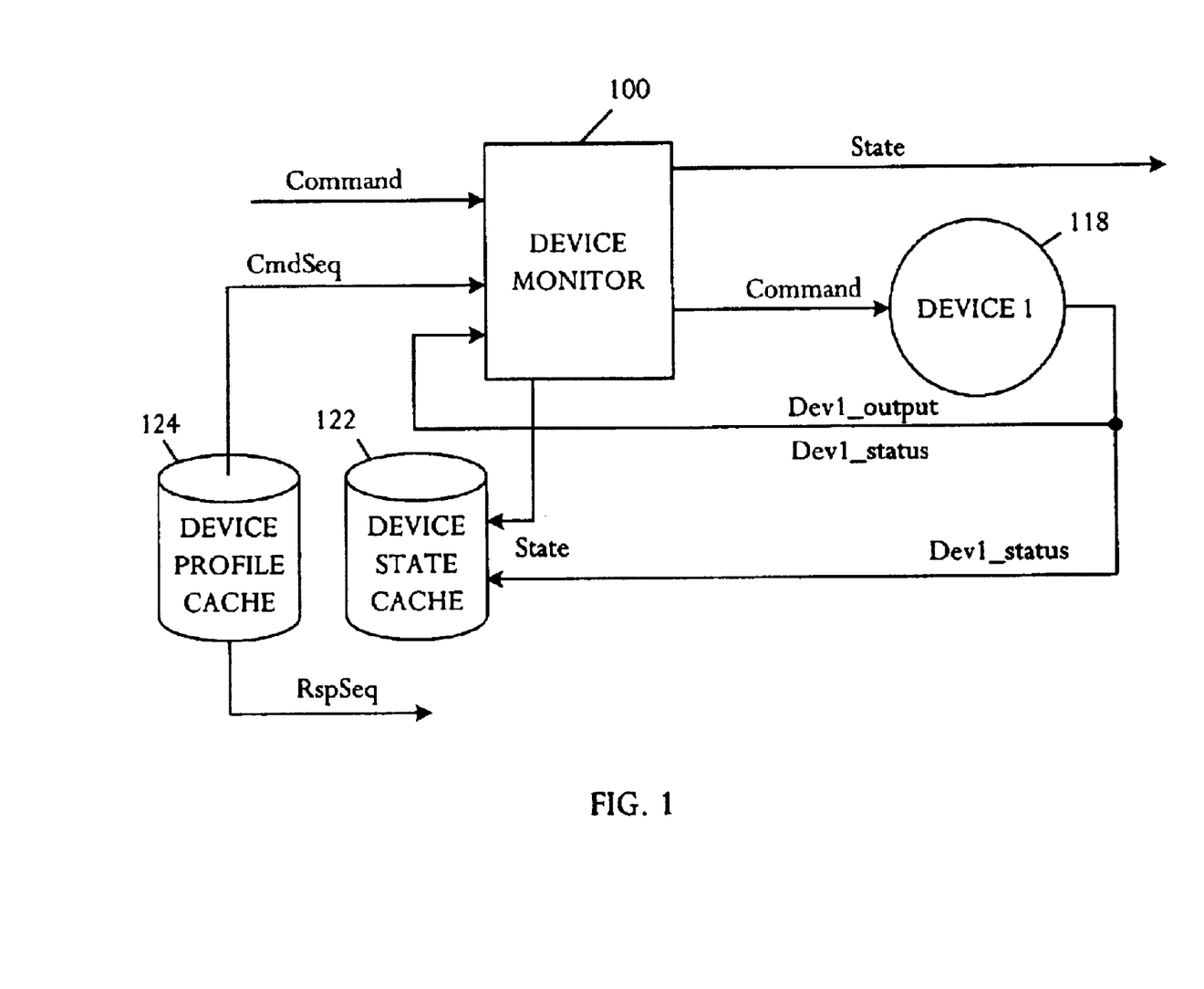
FIG. 1 is a schematic block diagram that illustrates an embodiment of a device monitor capable of determining device state via intelligent sampling.

Referring to FIG. 1, a schematic block diagram illustrates a device monitor 100 capable of determining state of a monitored device 118 via intelligent sampling. The device monitor 100 issues commands to, and captures status and some data from a device 118. Device 118 is typically a physical device. In a storage system, devices can be tape drives, disk drives, compact disk read-only memory (CDROM) drives, other types of storage devices, or combinations of devices now known or later developed.

The device monitor 100 ensures integrity of a device state cache 122 by intercepting sense and log data from incoming commands and generating sense and log commands, if appropriate, to refresh the device state cache 122. The device state cache 122 can be a volatile memory or storage that stores information for making a real-time determination of whether a device is bound. Device specific command sequences can be resolved by reading from a device profile cache 124. Device state can be resolved by reading from a device state cache 122, reducing the need to directly poll a device. The device profile cache 124 is typically a non-volatile memory or storage that stores command and response sequences for emulating a specific device type.

The device monitor 100 receives commands (Command), issues the commands to the device 118 and captures output signals (device output) including status information and data from the device 118. Device monitor 100 passes device state information Status to device state cache 122 to maintain integrity of device state cache 122.

Device monitor 100 intercepts sense log data from the commands and maintains accuracy of device state cache 122 by extracting state information from the device 118 data (device output) and passing the state information (State) to device state cache 122. Device monitor 100 extracts state information from device 118 status (Status) and passes the state information as a device state (State) to device state cache 122.

Device monitor 100 also generates sense log commands to refresh device state cache 122 when appropriate, with device specific command sequences resolved using stored command sequences (CommandSeq) from the device profile cache 124.

The device state cache 122 receives information including device state from device 118 to determine, in real-time, whether the device 118 is bound. The device state cache 122 can supply the result of the determination as a Bound signal.

The device profile cache 124 stores command sequences CommandSeq and response sequences RspSeq for emulating a device type. Command sequences CommandSeq pass to the device monitor 100. Response sequences RspSeq pass to other devices.

Figure 2:
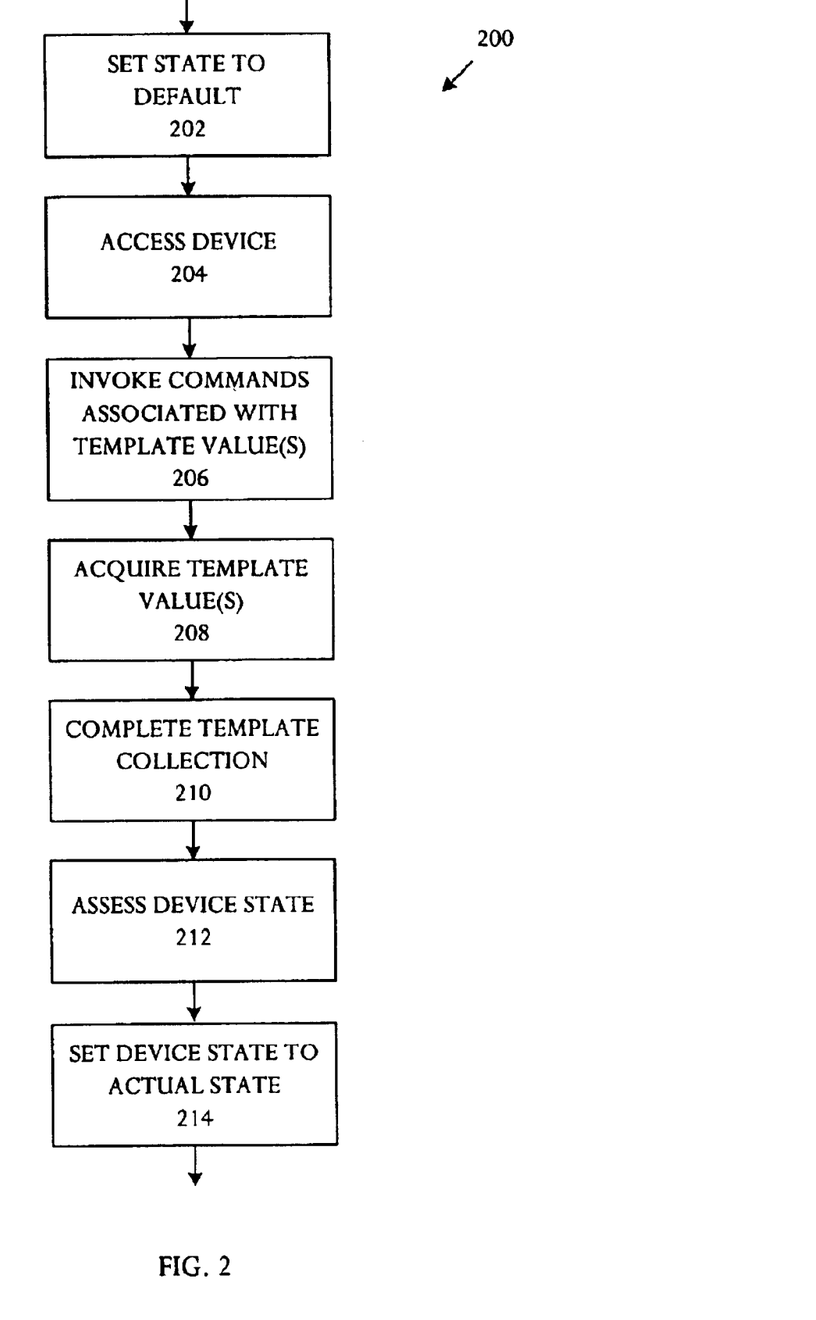
FIG. 2 is a flow chart illustrating an example of a suitable initialization technique in an embodiment of a method for determining state of a device.
Figure 5B:
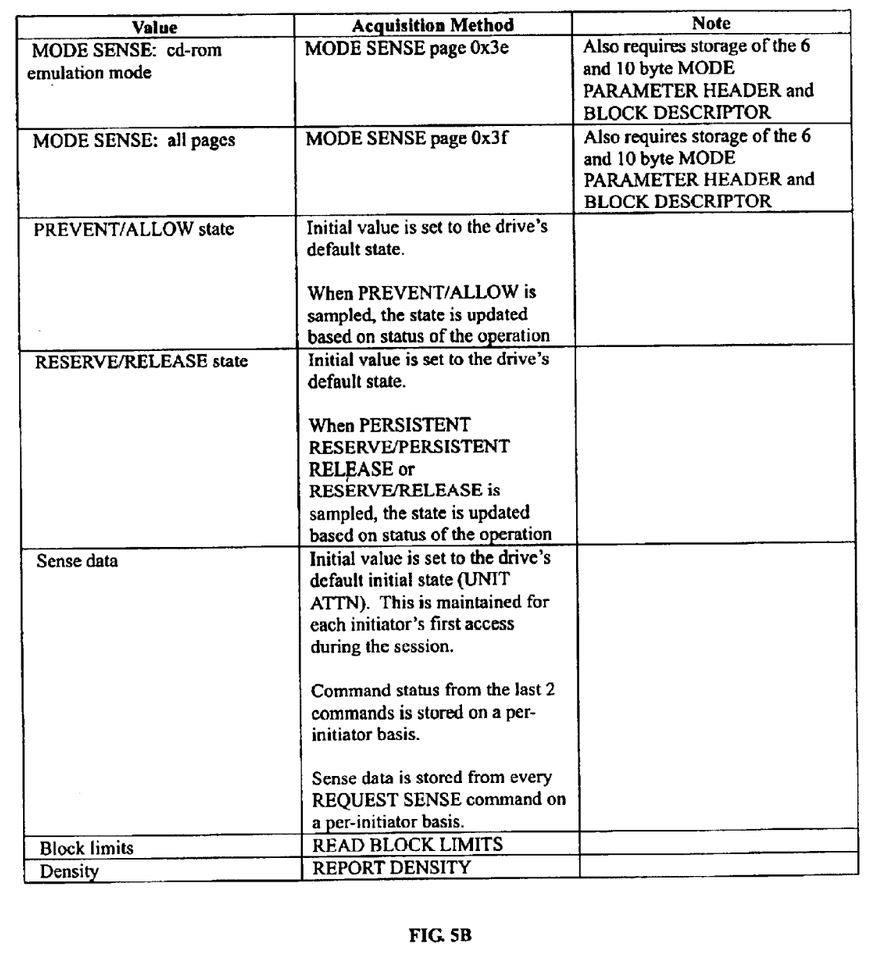

Referring to FIG. 2, a flow chart illustrates an example of a suitable initialization technique in a method for determining state of a device. The illustrative technique accesses and operates on a data structure or template of information that is suitable to define state of the device. Items in the template are application-specific and may vary depending on the device type, conditions of operation of the device, system conditions, and the like. In one illustrative example, a template in the table of FIGS. 5A and 5B shows data in a high-availability application.

At initialization 200 state output is set to a default value 202 determined by the application. The device monitor 100 establishes contact 204 with the device 118 with retry if initial attempts fail. The device monitor 100, either through commands received externally or internal programming, invokes methods or commands associated with template values 206 to collect the template values 208. For example, inquiry data can be obtained by invoking the inquiry command. When template value collection is complete 210, an assessment is made of device state 212. In some embodiments, the assessment can be made via control operations executing in the device monitor 100. In other applications, an external device or controller can invoke Commands and access the device output to assess state. Device state output is set 214 to reflect the actual device state.

Figure 3:
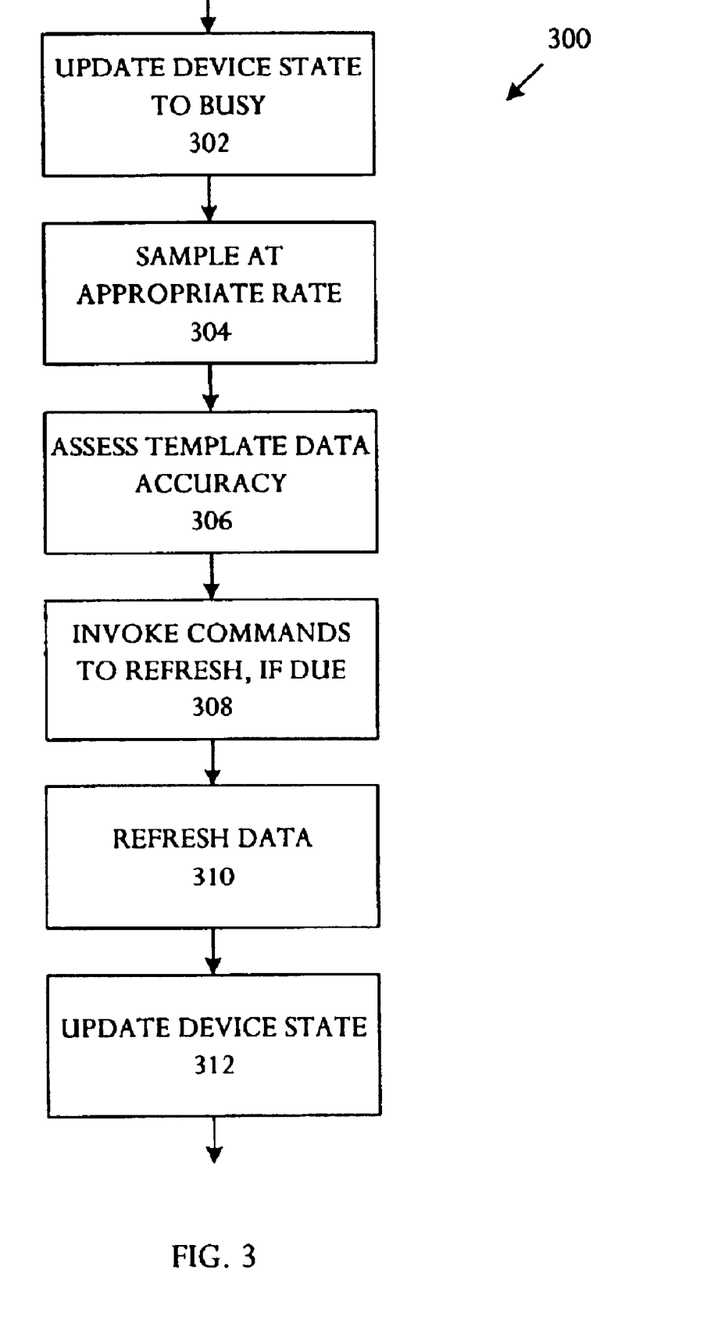
FIG. 3 is a flow chart that depicts an embodiment of a method of updating device state at steady state when no commands are present.

Referring to FIG. 3, a flow chart depicts a method of updating device state at steady state 300 when no commands are present. The device state output is updated to reflect a busy state 302 in preparation for state updating. Sampling becomes active 304 at time intervals selected from the highest frequency appropriate for a template's meta-data. Accordingly, sampling is done at intervals sufficient to track any possible state changes. The device monitor 100 assesses accuracy 306, for example based on the age of the data in the template, and invokes methods to refresh the data 308, if updating is due. The refresh methods comprise one or more commands issued to the device 118 in sequence that change or refresh the device state. The device monitor 100 refreshes template data and meta-data 310 resulting from device performance of the methods. The device monitor 100 updates the device state output signal 312 to reflect results of the invoked methods or commands.

Figure 4:
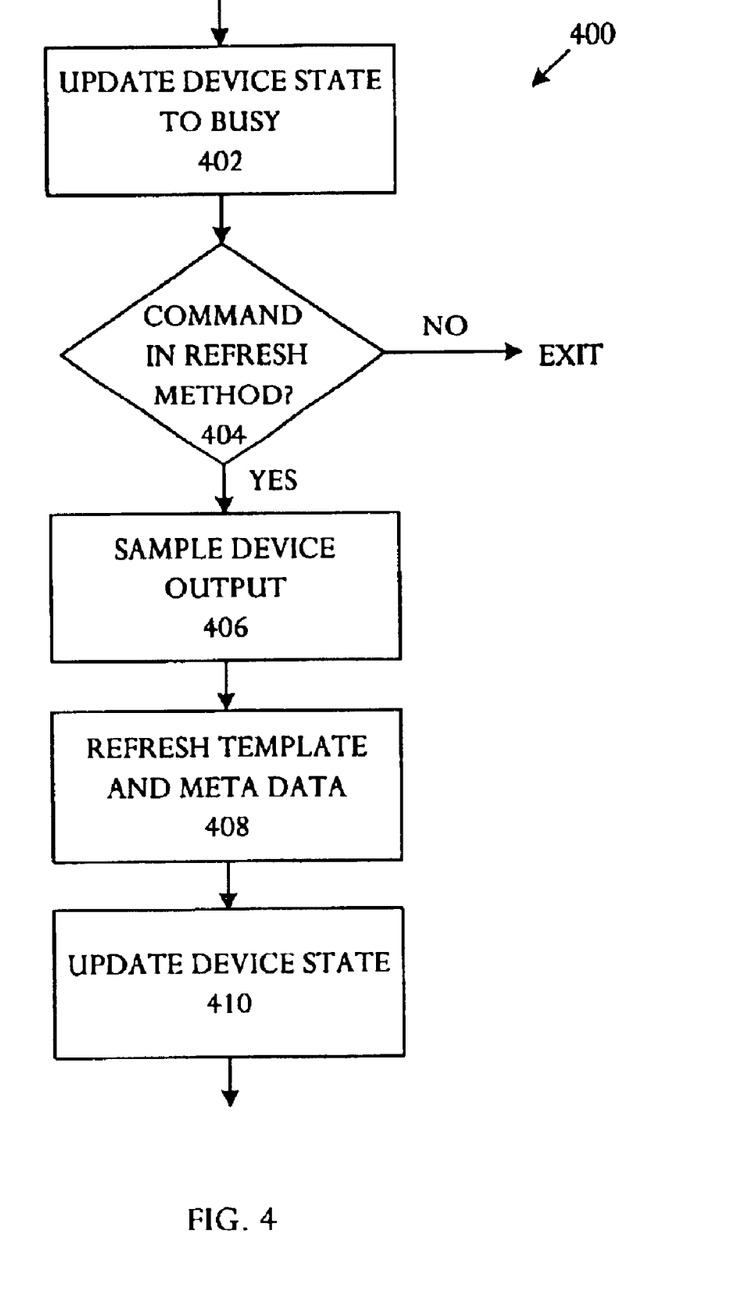
FIG. 4 is a flow chart that depicts an embodiment of a method of updating device state at steady state when commands are present.

Referring to FIG. 4, a flow chart depicts a method of updating device state at steady state when commands are present 400. The device state output is updated to reflect a busy state 402. If the present command is used in a refresh method 404, the device output is sampled 406 and passed to the system. The device monitor 100 refreshes the template data and the meta data based on the sample 408. The device monitor 100 updates the device state output signal 410 to reflect the actual device state.

The device monitor 100 can be implemented in various configurations such as hardware, software, firmware, and the like. Functional features may be implemented in a processor, microcontroller, central processing unit, state machine, programmable logic array, and other similar devices, unconstrained to a particular platform. The device monitor 100 is highly suitable for embedded systems and in processor-based systems.

Referring to FIGS. 5A and 5B, a table shows data in an example of a template that corresponds to a high-availability device application. Fields in the table or list contain meta-data such as accuracy or age, frequency or means of update, and update method. The table shows values that are set or updated in a template stored in the device state cache 122 in the first column. The second column shows commands that are issued during the acquisition method for updating the template. Typically the acquisition method can be stored in the device profile cache 124 and passed to the device monitor 100 to periodically update the template.

Figure 6:
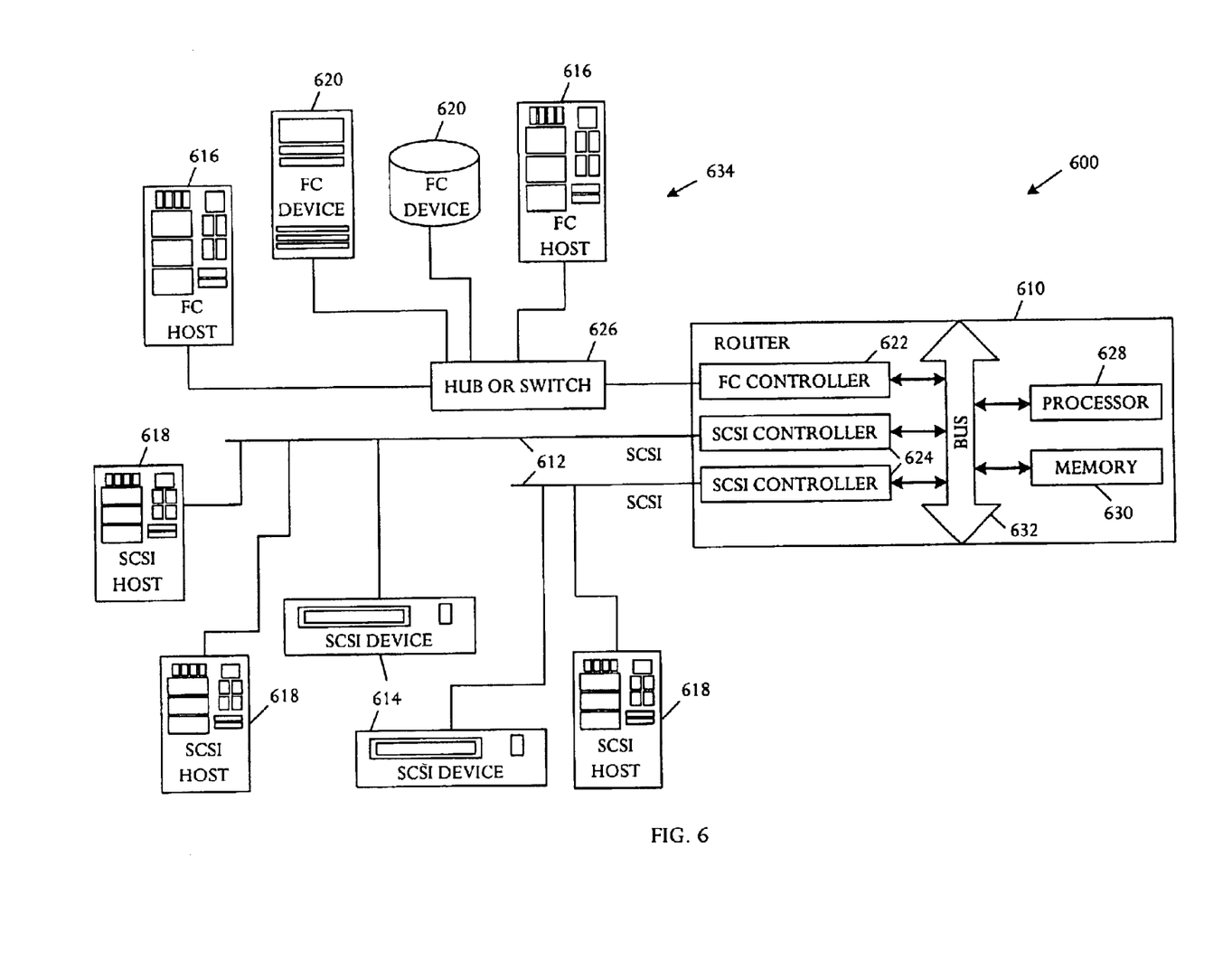
FIG. 6 is a schematic block diagram showing an example of a suitable router for usage in a storage system such as a storage area network (SAN).

Referring to FIG. 6, a schematic block diagram shows an example of a suitable router 610 for usage in a storage system 600 such as a storage area network (SAN). The router 610 enables bi-directional connectivity for narrow, wide fast, and ultra-2 Small Computer Systems Interface (SCSI) buses 612 in either a Fibre Channel Switched Fabric (FC-SW) or a Fibre Channel Arbitrated Loop (FC-AL) environment. The router 610 can translate Fibre Channel Protocol (FCP) to and from SCSI protocol, and transfers commands, data, and status information to and from Fibre Channel hosts 616 and devices 620 and SCSI hosts 618 and devices 614. The router 610 supports Fibre Channel hosts 616 and SCSI hosts 618 as initiator devices. The router 610 also supports Fibre Channel devices 620 including direct access devices such as Random Array of Inexpensive Disk (RAID) controllers, disk drives, Just a Bunch of Disks (JBOD), and the like. SCSI devices 614 include sequential access devices such as tape drives, tape libraries. Various SCSI devices 614 and Fibre Channel devices 620 include tape and magneto-optical libraries. Fibre Channel hosts 616 and devices 620 communicate to the router 610 via a hub or switch 626.

In other embodiments, for example future implementations, the illustrative system can be used in fibre-to-fibre routers, and Internet SCSI (iSCSI)-to-SCSI applications. Accordingly, the illustrative system and techniques can be used according to standards other than the illustrative fibre channel-to-SCSI implementation.

The router 610 typically has multiple controllers including one or more Fibre Channel Controllers 622 and one or more SCSI Controllers 624 for communicating via Fibre Channel and SCSI buses 612, respectively. The router 610 can further comprise a processor 628 that controls operations of the router 610 and a memory 630, for example a volatile memory and a nonvolatile memory. The processor 628 controls operations of the Fibre Channel and SCSI controllers 622 and 624 via communications on an internal bus 632.

The router 610 converts Fibre Channel host protocol to SCSI device protocol in response to encapsulated FCP protocol command packets issued from a Fibre Channel hosts 616 to the router 610. The router Fibre Channel Controller 622 interprets the Fibre Channel information and places the packet in a buffer memory 630. The processor 628 interprets the Fibre Channel information packet and programs the router SCSI Controller 624 to process the transaction. The router SCSI Controller 624 sends the command to the target SCSI device 614 and the SCSI device 614 interprets and executes the command.

In a SCSI-to-Fibre Channel protocol process, the initiator is a SCSI host 618 on the SCSI bus 612 that issues commands so that the information is passed through the router 610 to a target on the Fibre Channel Storage Area Network (FC-SAN) 634. The SCSI host 618 issues a command to the router 610. The router SCSI Controller 624 interprets the command and places the interpreted command in the buffer memory 630. The processor 628 interprets the data and programs the router Fibre Channel Controller 622 to process the transaction. The router Fibre Channel Controller 622 translates the data into an FCP protocol packet and sends the packet to the target Fibre Channel device 620. The target Fibre Channel device 620 interprets the FCP protocol packet and executes the command.

A storage system 600 can be configured as many different topologies and arrangements depending on the particular application. Often additional devices and components are added as capacity expansion is desired. One suitable type of topology is a cascaded fabric with a string of switches or levels of switches connected by one or more hubs or switches. Another suitable type of topology is a meshed fabric in which all switches are interconnected so that at least two paths or routes from any one switch to another exist in the fabric. A ring fabric is a continuous ring of switches connected into a single fabric. A backbone fabric has one or more switches acting as a fabric backbone connecting with other switches within the fabric so that the backbone switches function as routers with full bandwidth and redundant connectivity to all other switches. Other types of topologies are possible. Embodiments of the illustrative system can be used in topologies that include multiple initiators capable of simultaneously accessing or attempting to access a storage device.

Figure 7:
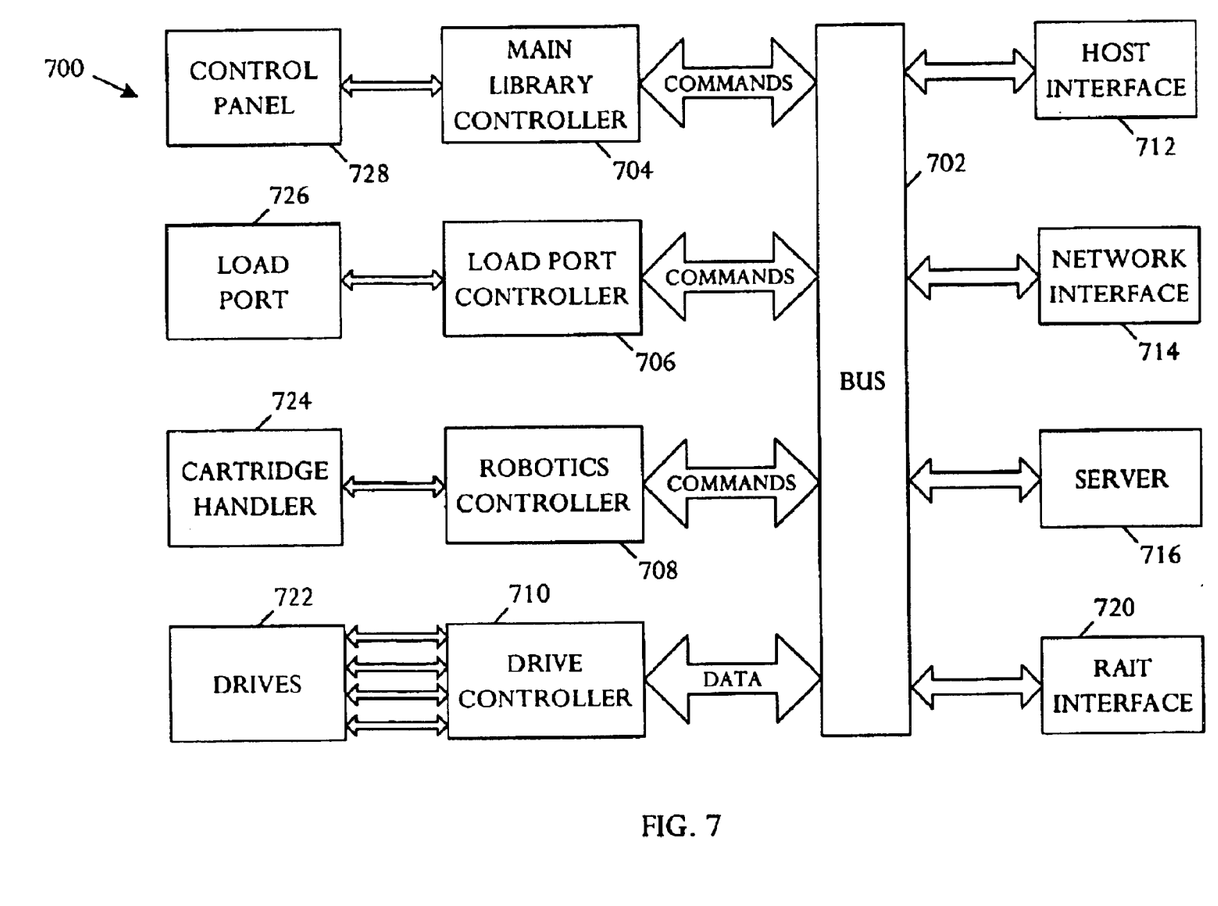
FIG. 7 is a schematic block diagram showing an example of a suitable storage device for usage as a Logical Unit Number (LUN).

Referring to FIG. 7, a schematic block diagram shows an example of a suitable storage device 700 for usage as a Logical Unit Number (LUN). The storage device 700 can be any type of storage device such as a drive or library. Some storage devices 700 can be tape drives or tape libraries, others can be disk drives or forms of optical storage drives. In one example, the storage device 700 can be a tape library that includes a dozen or more tape drives and slots for hundreds of tape cartridges. The storage device 700 can be operated using industry standard software or custom software as a direct attached device or as part of a multiple-server system.

The storage device 700 incorporates a bus backplane such as a PCI bus backplane to interface with multiple various types of devices, systems, or components. For example, the storage device 700 can include a bus 702 with connections to a host interface 712, a network interface 714, a server 716, and a Redundant Array of Inexpensive Tapes (RAIT) interface 720. The host interface 712 can support connectivity to various links including, but not limited to, SCSI, Ultra-SCSI, Ultra-2 SCSI, Gigabit Ethernet, Fibre Channel, and others, enabling connection directly to Fibre Channel backup servers and networks with additional fibre channel adapter cards. The network interface 714 can directly connect to networks with the addition of PC-Ethernet, Peripheral Component Interconnect-Fiber Distributed Data Interface (PCI-FDDI), Peripheral Component Interconnect-Asynchronous Transfer Mode (PCI-ATM) cards, and others. The server 716 interface can accommodate single card processors or CPUs or be used as a network-attached storage device. The RAIT interface 720 enables support of fault tolerance through auto-tape copy, mirroring, and tape stripping with parity by adding RAIT cards.

The storage device 700 has multiple controllers that control and manage various electrical or electromechanical components. The controllers can include a main library controller 704, a load port controller 706, a robotics controller 708, and a drive controller 710. The main library controller 704 is a system controller that performs multiple various control, management, and monitoring operations including multiple-host and library partitioning, serial communications control, diagnostics, and data pass-through. For example, the main library controller 704 supports system administration via connection to a control panel 728 such as a graphical user interface (GUI) touch screen for facilitating operational functionality, configuration, fault determination, diagnostic testing, and network interface such as a web interface. The drive controller 710 communicates with multiple storage drives 722 and controls multiple operations including data routing, drive utilization, and drive failover. The load port controller 706 communicates with a load port 726 and manages entry and exit of data cartridges into the storage device 700. In one example, the load port 726 can include one or more multiple cartridge removable magazines to facilitate cartridge import and export and off-site data storage. The robotics controller 708 communicates with robotics such as a cartridge handling mechanism 724 that carries data cartridges between storage slots, the storage drives 722, and the load port 726.

Commands received from the various interfaces, the host interface 704, network interface 706, server 708, and RAIT interface 710 control operations of at least the storage drives 722 and the robotics 724.

Figure 8:
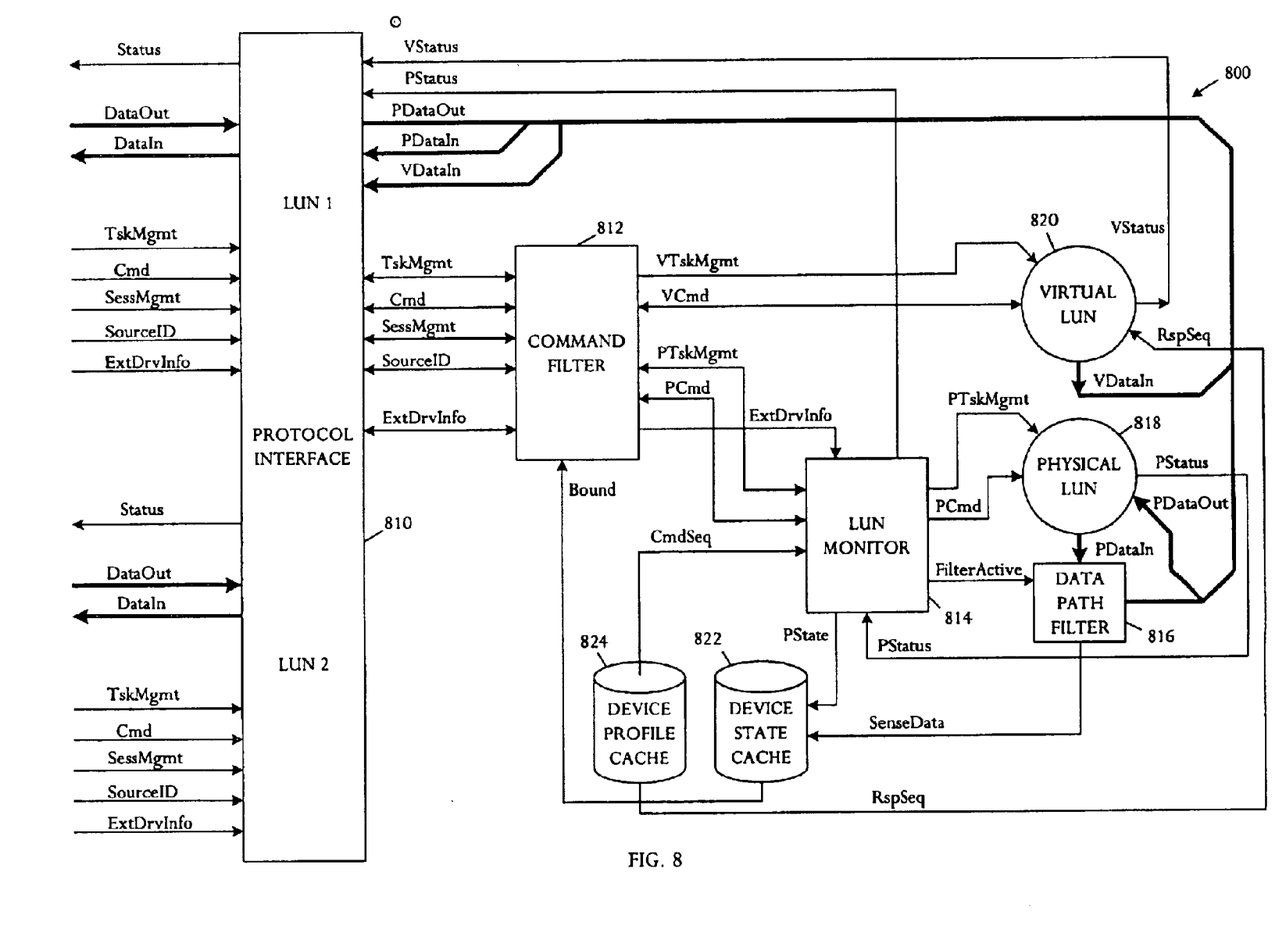
FIG. 8 is a schematic block diagram illustrates an embodiment of a storage system comprising router elements.

Referring to FIG. 8, a schematic block diagram illustrates a LUN virtualization system 800 comprising elements that operate to improve availability, data integrity, and performance. The LUN virtualization system 800 can be implemented in a router. The router is highly suitable for implementing virtualization because virtualization typically includes interception of messages, and message traffic generally passes through the router. In other embodiments, the LUN virtualization system 800 can be implemented in other devices, components, or systems such as switches, hubs, storage devices, storage libraries, servers, hosts, and the like. In some embodiments, the illustrative LUN virtualization system 800 can be implemented as firmware components that are capable of executing on a processor or controller in a router or other device. The block diagram for a LUN virtualization system 800 shows components and data flows for implementing availability, data integrity, and performance improvements for a single LUN. The data path is shown in bold lines. The LUN virtualization system 800 can be duplicated for each LUN supported by the router or other device.

The LUN virtualization system 800 comprises a protocol interface 810, a command filter 812, a LUN monitor 814, a data filter 816, a physical LUN 818, a virtual LUN 820, a device state cache 822, and a device profile cache 824.

The protocol interface 810 performs virtual/physical mapping to facilitate virtualization of storage LUNs. The protocol interface 810 receives commands and configures information blocks for transmission, for example by matching status to the correct command, and supplying header information for status frames. The protocol interface 810 also handles initiator protocol, for example by obtaining unit attention of the first access of an initiator. The protocol interface 810 can manage signals from multiple LUNs. The protocol interface 810 serves as a common interface point for external communications.

In one specific example, the protocol interface 810 can perform Fibre Channel-to-Small Systems Computer Interface (SCSI) conversion, receiving command packets from a host, stripping header and extraneous information, and passing a SCSI command. For returning information, the protocol interface 810 saves at least some of the stripped information and repackages the return information into suitable form for sending back to the initiating device.

The command filter 812 receives commands and task management directives and determines how and when a physical device acts on the commands and directives. The command filter 812 also determines whether commands are directed to a virtual LUN or the physical LUN. If a device is bound, commands from the binding initiator are passed through to the physical LUN, and commands from other initiators are either rejected or handled by the virtual LUN, depending on the command, conditions, and circumstances. In a specific illustrative example, the command filter 812 handles SCSI commands such as ABORT, RESET, TARGET RESET, ABORT TASK, ABORT COMMAND SET, and others.

The illustrative command filter 812 is a dynamic filter that filters information based on the state of a monitored device and can constantly update filter parameters as the state changes. The command filter 812 quickly and efficiently filters commands and task management directives to direct the commands and task management directives selectively to a LUN, for example to either the physical LUN 818 or the virtual LUN 820. The system constantly analyzes multiple conditions in a background process that extracts a single parameter, device state, from the conditions and the single parameter is the basis for filtering decisions. In the illustrative embodiment, the LUN monitor 814 executes the background process.

The command filter 812 also performs initialization for LUN virtualization. On system powerup and possibly other conditions, the system begins with no known state, no starting information. The initialization procedure collects information for storage in the device state cache 822 to enable LUN virtualization. In one embodiment, the command filter 812 calls for initialization and the LUN monitor 814 accesses storage elements in the device state cache 822 and determines that no state is defined. The LUN monitor 814 accesses the device profile cache 824 to fill storage elements in the device state cache 822.

The LUN monitor 814 issues commands to the physical LUN and captures status and some data from the physical LUN. The LUN monitor 814 maintains and ensures integrity of the device state cache. The LUN monitor 814 intercepts sense and log data from incoming commands to maintain accuracy of the device state cache, thereby maintaining the data structure containing the device state. The LUN monitor 814 also generates sense and log commands, if appropriate, to refresh the device state cache 822. Device specific command sequences can be resolved by using the device profile cache 824. Polling to obtain data is reduced to avoid conflicts.

The LUN monitor 814 can intelligently monitor command and task management directive traffic to continuously update device state. The LUN monitor 814 intercepts state information that becomes available as the physical LUN 818 performs commands requested by a host or initiator and updates the device state cache 822 based on the intercepted state information. Accordingly, the LUN monitor 814 can update state passively without issuing commands to the LUN and thereby increasing extraneous traffic. The physical LUN 818 produces status information PStatus as a result of performance of a command. The LUN monitor 814 can access PStatus and determine whether the information is useful for tracking and, if so, store or update information in device state cache 822. By updating information by passively tracking PStatus from externally-requested commands rather than actively requesting commands, the LUN monitor 814 can refresh the device state cache 822 without increasing command traffic to the physical LUN 818.

The LUN monitor 814 generally functions on the basis that a set of information is desired to describe conditions and operations of a device or LUN. Much of the information can be captured by passively monitoring traffic between an initiator and the LUN, including command, task management, data, and status traffic. The LUN monitor 814 refreshes information that is not captured within a suitable interval by issuing supplemental commands to the LUN. In the illustrative embodiment, the device state cache 822 stores desired information and the device profile cache 824 defines the information to store.

The LUN monitor 814 accesses information from the device profile cache 824 that identifies information to maintain in the device state cache 822. LUN monitor 814 tracks updating of the information and determines when information is to be refreshed, either because the information is unavailable or dated. When refresh is due, LUN monitor 814 can directly request information by issuing commands to the physical LUN 818. Device profile cache 824 contains various management information including identification of information that need not be updated once set, refresh rates for particular information, and the like. Some information may evolve at different rates. LUN monitor 814 can adapt refresh rates according to dynamically changing aspects of LUN operation.

The data filter 816 filters the data path for sense and log data. The data filter 816 enables access to data to monitor control information. For example, LOG PAGE and MODE SENSE information may be useful to track state. The data filter 816 enables filtering of the data path to access control information, for example copying information from the data path, while introducing only a small time delay. The data filter 816 becomes inactive, or transparent, when filtering is not desired. Data filter 816 can thus be implemented for low impact to the data path, thereby reducing delay in passing through the filter.

Typically most control information is obtained from status, PStatus, and not from the data path so that the data filter 816 can often be inactive. When active, the data filter 816 passes through information with no change to the passing information, precisely maintaining data integrity.

While physical LUN 818 is the driver for the physical drive or physical LUN, virtual LUN 820 is an emulator for the physical LUN that resolves device specific response sequences using the device profile cache 824. The virtual LUN 820 can emulate one or more behaviors of the physical LUN 818 and can respond to command directives. Examples of command directives include LOG SENSE, MODE SENSE, RECEIVED DIAGNOSTICS, INQUIRY, and others. The virtual LUN 820 typically is configured in the image of the physical LUN 818. In some embodiments, the amount of storage for the virtual LUN 820 can be limited so that the virtual LUN cannot receive large data quantities. In such embodiments, the virtual LUN 820 can source data because the supplied data is generally small, for example information stored in the device state cache 822 such as log pages and maintenance information. Embodiments with a large storage capacity can have greater capability to generate and receive data.

The device state cache 822 is a volatile memory or storage that stores information for making a real-time determination of whether a physical LUN is bound. In some embodiments, drive firmware modules hosted by the router can manage the device state cache 822.

The device profile cache 824 is typically a non-volatile memory or storage that stores command and response sequences for emulating a specific drive type. In some embodiments, drive firmware modules hosted by the router can implement the device profile cache 824.

The protocol interface 810 handles multiple signals in operation as a common interface for external communications. The protocol interface 810 receives task management information (TskMgmt) as incoming task management directives from various devices, illustratively a first LUN and a second LUN. Task management directives include TARGET RESET, Automatic Contingent Allegiance (ACA) task attribute, and ABORT TASK. The protocol interface 810 passes task management directives to the command filter 812 and may also receive task management directives in return from the command filter 812. Protocol interface 810 also receives incoming commands (Cmd) from the LUNs and passes the commands through to the command filter 812. The protocol interface 810 receives incoming session management (SessMgmt) directives from the LUNs, for example including LOGIN and LOGOUT directives. The protocol interface 810 passes the session management directives to the command filter 812 and also receives return session management directives from the command filter 812. Protocol interface 810 receives source identifier (SourceID) information from the LUNs and passes the information to the command filter 812. Other information from the LUNs to the protocol interface 810 includes extra drive information (ExtDrvInfo), information about drive state from external sources. For example, some libraries issue LOAD UNLOAD commands over the Automation Control Interface (ACI) port. Protocol interface 810 passes ExtDrvInfo to the command filter 812.

The protocol interface 810 is an interface to the data path including Data input (DataIn) lines to an initiator and data output (DataOut) lines from the initiator. DataIn are resolved by the protocol interface 810 from PDataIn, data read from the physical LUN, or VDataIn, data read from the virtual LUN. DataOut are resolved by the protocol interface 810 from Status information that is returned from either physical LUN 818 or virtual LUN 820. Status returns to the initiator via the protocol interface 810 from either the virtual LUN 820 or the physical LUN 818. The protocol interface 810 resolves Status from either VStatus or PStatus.

The command filter 812 operates upon the incoming commands Cmd, task management directives (TskMgmt), and session management directives (SessMgmt) from the initiators and filters the commands and directives to pass commands to the physical LUN 818 and the virtual LUN 820. The command filter 812 passes physical commands (PCmd) and physical task management commands (PTskMgmt) to the physical LUN 818. Command filter 812 determines task management handling by filtering physical task management commands (PTskMgmt) for the physical LUN 818. Command filter 812 directs commands to either physical LUN 818 or virtual LUN 820. In various conditions, such as conflicting commands from multiple LUNs, the command filter 812 filters the commands and sends virtual commands (VCmd) to the virtual LUN 820, and virtual task management commands (VTskMgmt) to the virtual LUN 820. The command filter 812 passes through external drive information (ExtDrvInfo) from the protocol interface 810 to the LUN monitor 814.

The command filter 812 uses information from the LUNs and from the device state cache 822 to filter the commands and directives. A Bound signal from the device state cache 822 contains state information deduced from contents of the device state cache 822. If physical LUN 818 is bound, command filter 812 passes commands from the bound initiator to the physical LUN 818 and rejects or redirects commands from other initators.

The LUN monitor 814 receives filtered physical commands PCmd and physical task management commands PTskMgmt from the command filter 812 and issues the commands to the physical LUN 818 and captures physical status PStatus and some physical data PDataIn from physical LUN 818. LUN monitor 814 passes physical status PStatus back to protocol interface 810 and to device state cache 822 to maintain integrity of device state cache 822. LUN monitor 814 intercepts sense, log data from the commands PCmd and PTskMgmt, passing a filter active (FilterActive) signal to the data filter 816 to activate and deactivate the filter. LUN monitor 814 management of data filter 816 maintains accuracy of device state cache 822. LUN monitor 814 and data filter 816 extract state information from the physical LUN 818 data (PDataIn) and pass the state information in a sense data (SensData) to device state cache 822. LUN monitor 814 extracts state information from physical LUN 818 status (PStatus) and passes the state information as physical device state (PState) to device state cache 822. LUN monitor 814 also generates sense, log commands to refresh device state cache 822 when appropriate with device specific command sequences resolved using stored command sequences (CmdSeq) from the device profile cache 824.

The data filter 816 receives physical data PDataIn from the physical LUN 818 and, under control of FilterActive from LUN monitor 814 filters the PDataIn and passes the filtered data as physical data out from the initiator (PDataOut) to the protocol interface 810 and back to physical LUN 818.

Physical LUN 818 is a physical storage drive, typically a tape drive but can be other types of drives such as disk drives, CD ROM drives and the like. Under direction of physical commands PCmd and physical task management directives PTskMgmt from the LUN monitor 814, the physical LUN 818 transfers data to and from an initiator. Physical data in to the initiator, PDataIn, is data accessed from physical LUN 818. Physical data out from the initiator, PDataOut, is data written to the physical LUN 818. Physical data PDataIn sent to an initiator can be filtered in the data path filter 816 to extract state information indicative of whether the physical LUN 818 is bound to an initiator. Physical device status information from the physical LUN 818 is accessed by the LUN monitor 814 and passed through the protocol interface 810 to an initiator.

Virtual LUN 820 is a virtual storage device that emulates various aspects of the physical LUN 818. In various embodiments, different aspects of a physical drive may be emulated. For example, in some embodiments, the virtual LUN 820 can emulate task management and/or other control aspects of operation. In other embodiments, virtual LUN 820 can include sufficient storage capacity to emulate data path aspects of operation. Under direction of virtual commands VCmd and virtual task management commands VTskMgmt from the command filter 812, virtual LUN 820 transfers information to and from an initiator. Physical data out PDataOut from an initiator can be written to the virtual LUN 820. Virtual data in VDataIn to an initiator is data that can be read from the virtual LUN 820. Device specific response sequences RspSeq are resolved by the device profile cache 824. Virtual status, VStatus, the status from the virtual LUN 820 passes to the protocol interface 810 for resolution and to an initiator.

Status is returned to the initiator from either physical LUN 818 or virtual LUN 820 and is resolved by the protocol interface 810 from either virtual status, VStatus, or physical status, PStatus.

The device state cache 822 receives information including physical device state PState and state information SenseData from the physical LUNs 818 to determine whether the physical LUN 818 is bound in real time. The device state cache 822 supplies the result of the determination as a Bound signal to the command filter 812 that uses the information to direct commands and management directives to the physical LUN 818 and the virtual LUN 820.

The device profile cache 824 stores command sequences CmdSeq and response sequences RspSeq for emulating a device type. Command sequences CmdSeq pass to the LUN monitor 814. Response sequences RspSeq pass to the virtual LUN 820.

Virtualization can be enabled and disabled, for example via task management directives TskMgmt that operate on the command filter 812 and LUN monitor 814 to pass all commands to the physical LUN 818. The virtualization feature is manageable on the basis that the feature can be enabled or disabled, as desired, for various reasons such as diagnostic analysis and testing, and capability to separately license the feature. In various implementations, the virtualization feature facilitates manageability by confining activation and deactivation in time to a single discrete interaction rather than a sequence of interactions. The system can avoid unstable or incorrect states using various techniques, such as initializing upon feature activation and sending status for all active LUNs upon feature deactivation.

Although the illustrative example describes a particular storage device and system, the techniques may be used for various other systems. Generally, the techniques can be applied to any system in which multiple hosts, servers, or initiators can attempt to access the same device concurrently, wherein the device can only address one request at a time.

What is claimed is:

1. An apparatus capable of determining a state of a device comprising:
   a controller; and
   a monitor executable on the controller and capable of passively monitoring traffic between an initiator and the device, determining when the passively monitored traffic is insufficient for identifying state of the device, actively issuing supplemental commands to the device to refresh device information when passively monitored traffic is insufficient, and determining device state from the device information.

2. The apparatus according to claim 1 wherein the monitor is further capable of intercepting incoming and/or outgoing traffic from the device and sampling the intercepted traffic to determine the state of the device.

3. The apparatus according to claim 1 wherein the monitor is further capable of polling the device for information when sampling does not supply information within a suitable time to maintain integrity of a data structure indicative of state of the device.

4. The apparatus according to claim 1 wherein the monitor is capable of analyzing multiple conditions in a background process that extracts a device state parameter from the multiple conditions, the device state parameter being a dynamic indication of device state.

5. The apparatus according to claim 1 further comprising:
   a device state cache coupled to the controller and coupled to a data path between at least one initiator and the device, the device state cache comprising a memory capable of storing information for making a real-time determination of whether the device is bound to an initiator.

6. The apparatus according to claim 1 further comprising:
   a device state cache coupled to the controller and coupled to a data path between the device and at least one initiator, the device state cache comprising a memory capable of storing information for determining state of the device.

7. The apparatus according to claim 1 further comprising:
   a device profile cache coupled to the controller comprising a memory capable of storing command and response sequences for emulating the device.

8. The apparatus according to claim 1 wherein the apparatus is part of a storage system that allocates access to the device among a plurality of initiators that can concurrently attempt to access the device.

9. The apparatus according to claim 1 wherein the device is selected from among a tape drive, a tape library, a disk drive, a disk library, and an optical disk drive.

10. The apparatus according to claim 1 wherein the apparatus is part of a device selected from among a switch, a hub, a storage device, a storage library, a server, and a host.

11. The apparatus according to claim 1 further comprising:
   a computer program product comprising an executable, computable program code supplied by a media or signal, the code implementing the monitor.

12. A method of obtaining device state comprising:
   passively monitoring traffic between an initiator and a physical device;
   determining when the passively monitored traffic is insufficient for identifying state of the physical device;
   actively issuing supplemental commands to the physical device to refresh physical device information when passively monitored traffic is insufficient; and
   determining device state from the physical device information.

13. The method according to claim 12 further comprising:
   intercepting incoming and/or outgoing traffic from the physical device; and
   sampling the intercepted traffic to determine state of the physical device.

14. The method according to claim 12 further comprising:
   polling the physical device for information when sampling does not supply information within a suitable time to maintain integrity of a data structure indicative of state of the physical device.

15. The method according to claim 12 further comprising:
   providing a template corresponding to physical device actions; and
   performing an initialization operation comprising:
      setting state output to a default value;
      establishing contact with the physical device;
      collecting template values;
      assessing device state when template values are collected; and
      setting a device state output signal to reflect actual state of the physical device.

16. The method according to claim 15 further comprising:
   invoking commands associated with values in the template to collect the template values.

17. The method according to claim 12 further comprising:
   providing a template corresponding to physical device actions; and
   setting device state at steady state with no commands present comprising:
      updating device state to a busy state;
      sampling physical device activity at an interval based on a highest change frequency in the template's meta-data,
      assessing accuracy of the sampled physical device activity;
      invoking methods to refresh template data and meta-data; and
   updating the device state according to results of the invoked methods.

18. The method according to claim 17 further comprising:
   assessing accuracy of the sampled physical device activity based on age of the data.

19. The method according to claim 12 further comprising:
   providing a template corresponding to physical device actions; and
   setting device state at steady state with commands present comprising:
      updating device state to a busy state;
      sampling physical device output information if a command is used in a refresh method;
      communicating the sampled physical device output information;
      refreshing template data and mete-data based on the physical device output sample; and
   updating device stale output information to reflect actual device state.

20. The method according to claim 12 further comprising:
   determining a bound state of the physical device comprising one or more of detecting media movement to the physical device, intercepting commands to the physical device, intercepting commands to a robotic that transports media to the physical device, detecting a LOAD UNLOAD comma rid to the physical device, detecting a sequence of TEST UNIT READY commands to the physical device, detecting a REWIND command to the physical device, and detecting a specific, unique and repeatable sequence of commands to the physical device.

21. An apparatus for obtaining device state comprising:

means for passively monitoring traffic between an initiator and a physical device;

means for determining when the passively monitored traffic is insufficient for identifying state of the physical device;

means for actively issuing supplemental commands to the physical device to refresh physical device information when passively monitored traffic is insufficient; and means for determining device state from the physical device information.

22. An article of manufacture comprising:

a computer usable medium having computer readable program code means embodied therein for causing a processor to passively monitor traffic between an initiator and a physical device;

a computer readable program code means for causing the processor to determine when the passively monitored traffic is insufficient for identifying physical device state;

a computer readable program code means for causing the processor to actively issue supplemental commands to the physical device to refresh physical device information when passively monitored traffic is insufficient; and a computer readable program code means for causing the processor to determine device state from the physical device information.

23. The article of manufacture according to claim 22 further comprising:

a computer readable program code means for causing the processor to intercept incoming and/or outgoing traffic from the physical device; and a computer readable program code means for causing the processor to sample the intercepted traffic to determine state of the physical device.

24. The article of manufacture according to claim 22 further comprising:

a computer readable program code means for causing the processor to poll the physical device for information when sampling does not supply information within a suitable time to maintain integrity of a data structure indicative of state of the physical device.

25. A computer program product for use with a storage device comprising:

a computer usable medium having computer readable program code means embodied therein for causing a processor to passively monitor traffic between an initiator and a physical device;

a computer readable program code means for causing the processor to determine when the passively monitored traffic is insufficient for identifying physical device state;

a computer readable program code means for causing the processor to actively issue supplemental commands to the physical device to refresh physical device information when passively monitored traffic in insufficient; and a computer readable program code means for causing the processor to determine device state from the physical device information.

26. The computer program product according to claim 25 further comprising:

a computer readable program code means for causing the processor to intercept incoming and/or outgoing traffic from the physical device; and a computer readable program code means for causing the processor to sample the intercepted traffic to determine state of the physical device.

27. The computer program product according to claim 25 further comprising:

a computer readable program code means for causing the processor to poll the physical device for information when sampling does not supply information within a suitable time to maintain integrity of a data structure indicative of state of the physical device.

28. A device monitor for usage in a data storage system that includes multiple initiators capable of transferring data to and from a storage device of a plurality of storage devices, the device monitor comprising:

an interface that couples into a communication pathway between the multiple initiators and the storage device enabling the device monitor to intercept and monitor traffic including commands and task management directives between the multiple initiators and the storage device;

a monitor coupled to the interface that passively monitors traffic between the multiple initiators and the storage device regardless of traffic origin, determines when the passively monitored traffic is insufficient for identifying a physical device state of the storage device, and independently generates commands to the storage device and accesses responses evoked by the commands to maintain accuracy of the physical device state.

29. The device monitor according to claim 28 further comprising:

a device state cache coupled to the monitor that stores physical device state information relating to the storage device, the monitor intercepting sense and log data from commands from an initiator of the multiple initiators to the storage device, and generating sense and log commands to refresh the device state cache.

30. The device monitor according to claim 28 further comprising:

a device state cache coupled to the monitor that stores physical device state information relating to the storage device, the monitor intercepting sense and log data from commands from an initiator of the multiple initiators, passing state information to the device state cache, extracting state information from the storage device, and passing the extracted state information to the device state cache.

* * * * *